United States Patent
Kruse

(10) Patent No.: US 10,346,607 B2
(45) Date of Patent: *Jul. 9, 2019

(54) AUTOMATIC ROTATION AND STORAGE OF SECURITY CREDENTIALS

(71) Applicant: Amazon Technologies, Inc., Seattle, WA (US)

(72) Inventor: William Frederick Kruse, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,639

(22) Filed: Aug. 16, 2016

(65) Prior Publication Data

US 2016/0357955 A1 Dec. 8, 2016

Related U.S. Application Data

(63) Continuation of application No. 14/524,321, filed on Oct. 27, 2014, now Pat. No. 9,424,419.

(51) Int. Cl.
*G06F 17/00* (2019.01)
*G06F 21/45* (2013.01)
*G06F 21/31* (2013.01)

(52) U.S. Cl.
CPC .............. *G06F 21/45* (2013.01); *G06F 21/31* (2013.01)

(58) Field of Classification Search
CPC combination set(s) only.
See application file for complete search history.

(56) References Cited

U.S. PATENT DOCUMENTS

| 5,983,353 | A | 11/1999 | McHann, Jr. |
| 7,870,135 | B1 * | 1/2011 | Cheung .............. G06Q 30/0601 707/737 |
| 8,209,749 | B2 * | 6/2012 | Babula ................ H04L 63/0272 726/15 |
| 8,533,789 | B1 * | 9/2013 | Raghunathan .......... G06F 21/45 709/225 |
| 9,699,173 | B1 * | 7/2017 | Roth .................... H04L 63/0846 |
| 10,129,234 | B2 * | 11/2018 | Uetabira ............... H04W 4/029 |
| 10,146,931 | B1 * | 12/2018 | Kronrod ............. H04L 63/0846 |
| 2005/0064938 | A1 * | 3/2005 | Xidos ..................... G07F 17/32 463/40 |

(Continued)

*Primary Examiner* — Phy Anh T Vu
(74) *Attorney, Agent, or Firm* — Davis Wright Tremaine LLP

(57) ABSTRACT

A system and method for a credentials agent that automatically rotates and stores security credentials to be used at least in part to authenticate calling applications with a computing resource service provider. Upon determining that a first set of credentials are due to be rotated, the credentials agent may obtain a second set of credentials and store the second set of credentials in a data store. The credentials agent may give notice to a calling application that the first set of credentials is due to be rotated, whereupon the calling application may obtain the second set of credentials and be authenticated to access a resource of the computing resource service provider at least in part by providing the second set of credentials. The authorization system provides visualizations and alerts to administrators of unexpected states that may be caused by misconfigured applications or malicious users.

20 Claims, 9 Drawing Sheets

(56) References Cited

U.S. PATENT DOCUMENTS

| | | | |
|---|---|---|---|
| 2005/0245229 A1* | 11/2005 | Brown | G06F 21/31 |
| | | | 455/404.1 |
| 2007/0006163 A1 | 1/2007 | Aoki et al. | |
| 2008/0196101 A1 | 8/2008 | Sade et al. | |
| 2008/0235805 A1* | 9/2008 | Pfitzmann | G06F 21/10 |
| | | | 726/27 |
| 2010/0100948 A1* | 4/2010 | Delia | G06F 21/31 |
| | | | 726/6 |
| 2010/0175115 A1* | 7/2010 | Choi | G06F 21/33 |
| | | | 726/6 |
| 2011/0219227 A1* | 9/2011 | Sharif | G06F 21/33 |
| | | | 713/158 |
| 2012/0060213 A1* | 3/2012 | Childress | G06F 21/31 |
| | | | 726/18 |
| 2012/0084187 A1 | 4/2012 | Sperling et al. | |
| 2013/0086388 A1* | 4/2013 | Tesch | H04L 9/3236 |
| | | | 713/183 |
| 2013/0198828 A1 | 8/2013 | Pendergrass et al. | |
| 2017/0300687 A1* | 10/2017 | Cherukuri | G06F 21/45 |

* cited by examiner

AUTOMATIC ROTATION AND STORAGE OF SECURITY CREDENTIALS

CROSS REFERENCE TO RELATED APPLICATION

This application is a continuation of U.S. patent application Ser. No. 14/524,321, filed Oct. 27, 2014, entitled "AUTOMATIC ROTATION AND STORAGE OF SECURITY CREDENTIALS," which is incorporated by reference for all purposes.

BACKGROUND

Computing resource service providers often require entities (such as users and running applications), who request access to services to prove their identities. These identities are often proved by demonstrating possession of a set of security credentials to the computing resource service provider. For example, an entity may provide a username and corresponding password to the service to enable the service to authenticate the entity to perform requested actions within the service. However, the longer a particular set of credentials are used for accessing resources of the computing resource service provider, the greater the risk that the set of credentials may be compromised by malicious users. Rotation of credentials can be burdensome on users and network security personnel of the computing resource service provider. Furthermore, identification of important applications that have been hard-coded with old sets of credentials is often difficult without adversely affecting (e.g., rendering partially or fully inoperable) applications by disabling the old sets of credentials.

BRIEF DESCRIPTION OF THE DRAWINGS

Various embodiments in accordance with the present disclosure will be described with reference to the drawings, in which.

DETAILED DESCRIPTION

Figure 1:
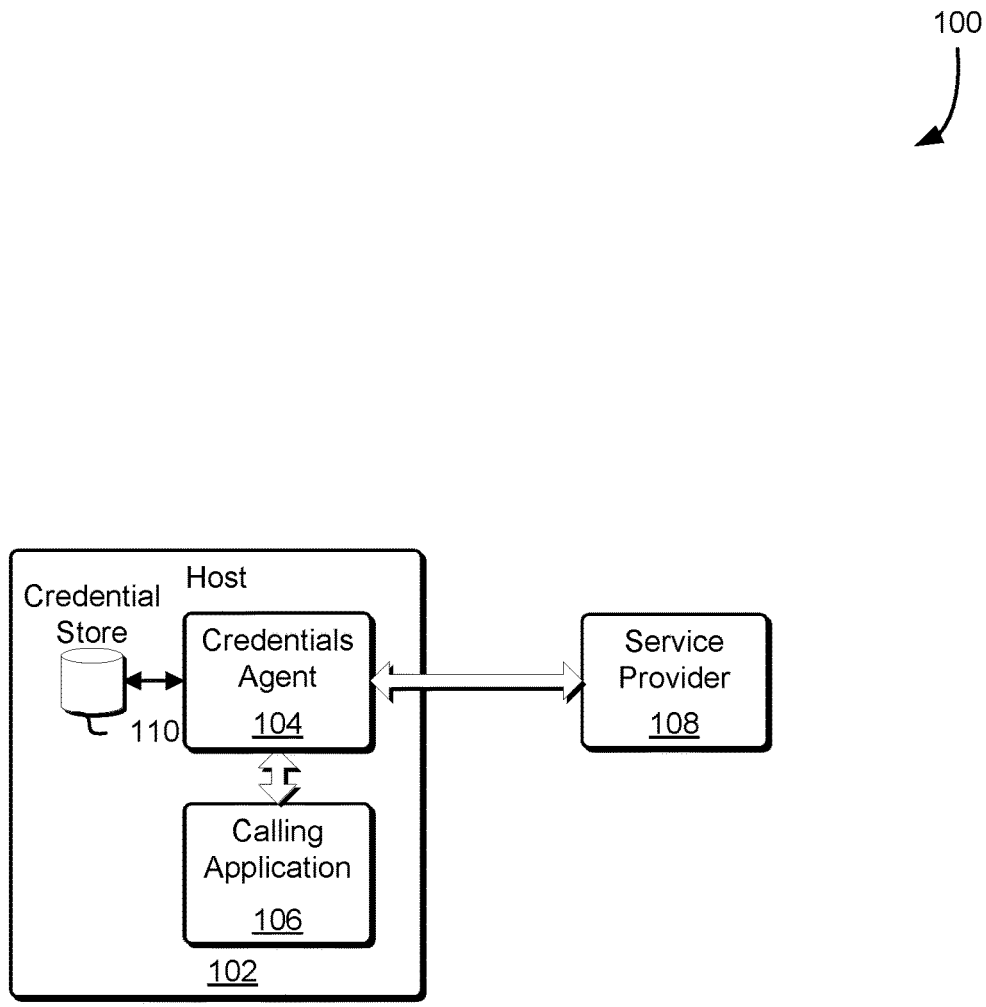
FIG. 1 illustrates an example of credentials agent in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for providing an automated mechanism through which new credentials for a calling application may be created and locally stored, and old credentials may be deactivated. In an embodiment, a calling application (i.e., an application requesting access to a resource of a service of a computing resource service provider) retrieves a current set of credentials from a credential store (e.g., a data store for storing sets of credentials). The calling application may then use this current set of credentials as proof of authorization to call the service to the computing resource service provider. As an example, the calling application may make an application programming interface call, signed with the current set of credentials, to a service of the computing resource service provider requesting access to one or more service resources. Upon receiving the request, the service may provide the signed request to an authentication service, whereupon the authentication service may then make a determination whether the requestor is authorized to have the access request fulfilled. Note that, as used within the present disclosure, a "set" may have one or more members.

Periodically, as needed, or as may be specified by a credential rotation policy, a service of the computing resource service provider or a credentials agent may signal the calling application that a new set of credentials are necessary. In response to the notification, the calling application may obtain new credentials and store the new credentials in the credential store. It is noted that in the context of the present disclosure, descriptions of the calling application and the credentials agent (or other application) performing tasks generally refer to executable code of the respective application/agent (or other application) that, when being executed by one or more of a computer system, causes the task to be performed by the computer system. Note that in some embodiments, a credentials agent generates the new set of credentials and the calling application obtains the new set of credentials from the credentials agent. In other embodiments, a service of the computing resource service provider generates the new set of credentials and provides the new set of credentials to a credentials agent or the calling application. In the case of the former, the calling application may then obtain the new set of credentials from the credentials agent. In some embodiments, the credentials agent performs the task of storing the credentials in the credential store, and in such embodiments, the calling application obtains the new set of credentials directly from the credential store. Note that, in some embodiments, the functionality of the credentials agent is integrated as part of the calling applications, whereas in other embodiments the credentials agent is a separate application. In a case of the latter, the credentials agent may run on the same computer system as the calling application, a different system of the calling application, or as part of a service of the computing resource service provider.

The calling application may then use the new set of credentials to access the resource of the service of the computing resource service provider, and, periodically or whenever notified to, the calling application may check that the possessed set of credentials are up-to-date. In some embodiments, the credentials agent or other application of the computing resource service provider checks whether the old set of credentials are still in use, and, if the old set of credentials are not in use ("expected state"), the old set of credentials may be deactivated. In some cases, the old set of credentials is not immediately deactivated, but continued usage of the old sets of credentials may be tracked over time. If the old sets of credentials are detected as still being in use (e.g., the usage level remains above a preconfigured threshold usage rate over a certain amount of time), it may indicate a security misconfiguration (e.g., credentials hard-coded into an application) or that credentials have been compromised (e.g., in use by an unauthorized entity). In either of these cases, such use of an old set of credentials may be considered as an "unexpected state" or "misconfigured state." For example, the expected state may be for usage of an old set of credentials to decrease to a threshold of 17 uses within a 48 hour time period, and if 18 uses are detected, network security personnel may be notified that an unexpected state has occurred.

In some embodiments, a credentials agent possesses logic or a credential rotation policy that specifies when old sets of credentials should be rotated. In these embodiments, calling applications may only be responsible for obtaining new sets of credentials from the credentials agent in accordance with the credential rotation policy. For example, the calling application may receive a new set of credentials pushed to it by the credentials agent, or may receive the new set of credentials in response to a request for the credentials from the credentials agent, or by the calling application retrieving the new set of credentials from the credential store. The computing resource service provider may monitor these credential rotations and alert (i.e., notify) network security personnel if an unexpected/misconfigured state is detected. The computing resource service provider may also provide the network security personnel with information about where such old sets of credentials are still being user (e.g., by logging and providing internet protocol addresses of requestors, the identities of services that are being accessed, identities of application programming interfaces that are being used with the old sets of credentials, etc.). Usage of new and old sets of credentials may be displayed graphically on a user interface screen over time, with usage of old sets of credentials gradually decreasing to zero on a graph, and unexpected states may be visually identified by usage of old sets of credentials not decreasing to zero on the graph.

The described and suggested techniques improve the field of computing, and specifically the field of network security and application authentication, by providing a new and useful system for rotating security credentials for calling applications and detecting unexpected and misconfigured usage of old security credentials. Additionally, the described and suggested techniques improve the functioning of computer systems by allowing unauthorized and misconfigured access to the computer systems to be quickly identified and mitigated through alerts and other tracking mechanisms. Moreover, the described and suggested techniques offer meaningful advantages over general credential management systems by providing a tool that intelligently determines when to generate new credentials, when to deactivate old credentials, and propagate the new credentials to their corresponding calling applications.

FIG. 1 illustrates an aspect of an environment 100 in which an embodiment may be practiced. As illustrated in FIG. 1, the environment 100 may include a host 102 that hosts a credentials agent 104 and a calling application 106 in communication with a resource service provider 108. The host 102 may be any host computer system suitable for hosting one or more applications. For example, the host 102 may be an individual computer system running a single operating system, may be a virtual machine instance, may be an individual computer system with one or more virtual machine instances, or may be a distributed network of computer systems. The host 102 may include a credential store 110 for storing credentials (also referred to as a credential store), which may be one or more of memory, including static and dynamic volatile memory and virtual memory. The credential store 110 may additionally or alternatively include persistent storage, such as optical and magnetic storage disks, magnetic tape storage, flash memory, and solid state storage devices, and/or may include data storage provided by one or more other computer systems. The host 102 may also include additional hardware, such as buses, input/output ports, and networking equipment. The host 102 may be configured to host applications, such as the calling application 106, that may utilize services and resources from the computing resource service provider 108.

In some examples, "credentials agent" may refer to security credential management logic configured to manage and rotate credentials of a calling application, such as the calling application 106, and may be integrated into the calling application or may execute separately from the calling application. As illustrated in FIG. 1, the credentials agent 104 may be a standalone application or background service. In some embodiments, the calling application 106 acts as an intermediary between the calling application 106 and the resource service provider 108, and requests (e.g., authorization requests, read request, write request, control requests to virtual machine instances, etc.) may pass through the credentials agent 104 on their way to and from the calling application 106. During this routing, a trigger condition signifying that a credential rotation is due may be detected by the credentials agent 104.

In some embodiments, the conditions for triggering credential rotation are specified in a credential rotation policy held by the resource service provider 108, while in other embodiments the credential rotation policy are held by the credentials agent 104. The entity that holds the credential rotation policy may be responsible for enforcing the credential rotation policy. For example, in some embodiments, a trigger mechanism for indicating that it is time to get new credentials is a timer; e.g., the credentials agent 104 may be configured to change the password of the calling application 106 every twelve hours. In other embodiments, the trigger to rotate credentials is determined according to a stochastic scheme in order to make it difficult for attackers to predict when credential rotation may occur. In still other embodiments, the credentials agent 104 is triggered to rotate a credential after usage of the credential has increased or decreased beyond a certain threshold.

Additionally or alternatively, the computing resource service provider 108 may hold the credential rotation policy. In such embodiments where the credentials agent 104 operates as an intermediary between the calling application 106 and the computing resource service provider 108, the computing resource service provider 108 also indicates to the credentials agent 104 when it is time to rotate credentials. For example, in a response to a request for data, the resource service provider 108 may append a message to the credentials agent 104 with the requested data indicating that it is time to rotate credentials. In other cases of this embodiment, the computing resource service provider 108 will push notification to the credentials agent 104 that it is time to rotate credentials.

In some examples, "rotation" of credentials may refer to the steps of creating a new set of credentials, notifying the appropriate computing resource service provider of the new set of credentials, and deactivating the old set of credentials.

In some cases, "rotation" also includes waiting for a certain amount of time between notifying the service of the new set of credentials and deactivating the old set of credentials. Such as waiting for an amount of time determined to allow a majority of calling applications using the old set of credentials to transition to the new set of credentials, or waiting for a time period determined to allow sufficient amount of time for usage of the old set of credentials to drop to zero. In embodiments where the credentials agent 104 holds the credential rotation policy, it is the credentials agent 104 that notifies a service of the computing resource service provider 108 when credentials are rotated or are to be rotated. In some cases, this notification may be appended or included with a request for data from or along with a transmission of data to the service of the computing resource service provider 108.

In a similar manner, the credentials agent 104 may also notify the calling application 106 of new credentials when it provides the requested data to the calling application 106. These new credentials may be passed directly to the calling application 106 or, alternatively, the calling application 106 may retrieve the credentials directly from the credential store 110. In embodiments such as the environment 100 depicted in FIG. 1, responses and/or data retrieved from services of the computing resource service provider 108 for the calling application 106 may be received at the calling application 106 with notice that the current credentials are due to be rotated. In some of these embodiments, the notice to the calling application 106 may be included with the response and/or data by the credentials agent 104 as the response and/or data is passed through the credentials agent 104 from the computing resource service provider 108. In other embodiments, the notice to the calling application 106 may be included with the response and/or data by the computing resource service provider 108. In still other embodiments, notice to rotate credentials is received independent of a request from a calling application 106 to the computing resource service provider 108 or a response and/or data from the computing resource service provider 108 to the calling application.

The credentials agent 104 may be an application that runs continually in the background or may be scheduled to launch periodically according to a specified schedule. The credentials agent 104 may store the current set of credentials in the credential store 110. Then, when the current credentials are changed to new credentials, the new credentials may be stored in the credential store 110 by appending the new credentials to the credential store 110 or overwriting the previous credentials in the credential store 110. In some embodiments, the password is caused to change according to a specified time period. Additionally or alternatively, in other embodiments, the password is caused to change in response to a demand from a user or the computing resource service provider 108. Additionally or alternatively, in still other embodiments, the password is caused to change after a certain number of uses. The credential store 110 may be a data store for storing one or more credentials for the calling application 106. Among other examples, the credential store 110 may be a database stored on a hard drive, may be stored in random access memory, or may be stored as encrypted text. In different embodiments, the credential store 110 is stored at the host 102, may be stored on a remote host, or may be stored on one or more computers of the computing resource service provider 108.

When an application, like the calling application 106, makes a call, such as an application programming interface call, to a service of a computing resource service provider, the application may need to authenticate itself with the service with a set of credentials. For example, the calling application 106, having sufficient privileges, may make requests to a service of the computing resource service provider to have the service instantiate (i.e., to create and provide) resources such as a database resource and file storage for the calling application. Commands and requests to the services may be performed by programmatic function calls to an application programming interface under the authority of a customer account for the service. The computing resource service provider may have a system (such as the authentication system 818 of FIG. 8) that may determine, in response to a call to an appropriate application programming interface handler, whether a requested access is permitted according to one or more policies determined to be relevant to the request. As an example, the authorization system may verify that the requested access is directed to data objects contained in the requestor's own logical data containers or data containers that the requester is otherwise authorized to access. In some cases, the authorization system may check the validity and integrity of a request based at least in part on information encoded in the request, such as validation information encoded by a data object identifier. In some cases, authentication system may verify a set of credentials and other information submitted with an application programming interface request, such as username and password, Internet Protocol address, cookies, digital certificate, and/or digital signature. In other cases, authentication service may require the calling application to provide additional information or perform additional steps to authenticate the request, such as may be required in a multifactor authentication scheme under a challenge-response authentication protocol.

In an embodiment of the present disclosure, a security policy is in place that requires the set of credentials to be changed on-demand or regularly, according to a rotation schedule. The credentials agent 104 allows one or more credentials to be automatically rotated as needed, which may be particularly useful in cases where multiple instances of the same application utilize the same credentials. In order to reduce a risk that the credentials could be intercepted, impersonated, or otherwise compromised, the credentials agent 104 may cause the password to be changed periodically or on-demand. Furthermore, because deactivating an old set of credentials may cause non-compliant applications using the old credentials to be unable to communicate with the service, the credentials agent 104 may also allow for the identification and tracking of such non-compliant and/or other applications still using the old set of credentials, and, in some cases. In these embodiments, the credentials agent 104 delays deactivation of the old set of credentials until such time as the non-compliant applications may be brought into compliance (e.g., configured with its own credentials agent) and/or until such time as applications using the old set of credentials can be identified. In other embodiments, the credentials agent 104 additionally or alternatively causes network security personnel to be notified about the non-compliant applications or other unexpected states; e.g., notifications may be given be in the form of pop-up window, text message on a mobile device, e-mails, or visually arresting graphics rendered in a user interface.

The calling application 106 may be any executable computer application configured to communicate with one or more services of the computing resource service provider 108 and configured to use credentials supplied by the credentials agent 104. For example, the calling application 106 may be an application configured to read and/or write data to a data storage service of the computing resource service provider 108, such as a mapping application configured to read map data from a database stored with the data storage service. In order for the computing resource service provider 108 to be able to verify that the calling application 106 is authorized to have its service request (e.g., read request, write request, etc.) fulfilled, the calling application 106 may provide proof it has possession of sufficient credentials. For example, the calling application 106 may supply, as its credentials, an identity (such as a unique identifier for the application) and information sufficient to prove access to the credentials, such as a password, a cryptographic hash/digest of the password, cryptographic digital signature generated by a signing encryption key, or other secret key verifiable by the computing resource service provider 108 for authorizing the identity of the calling application.

Figure 8:
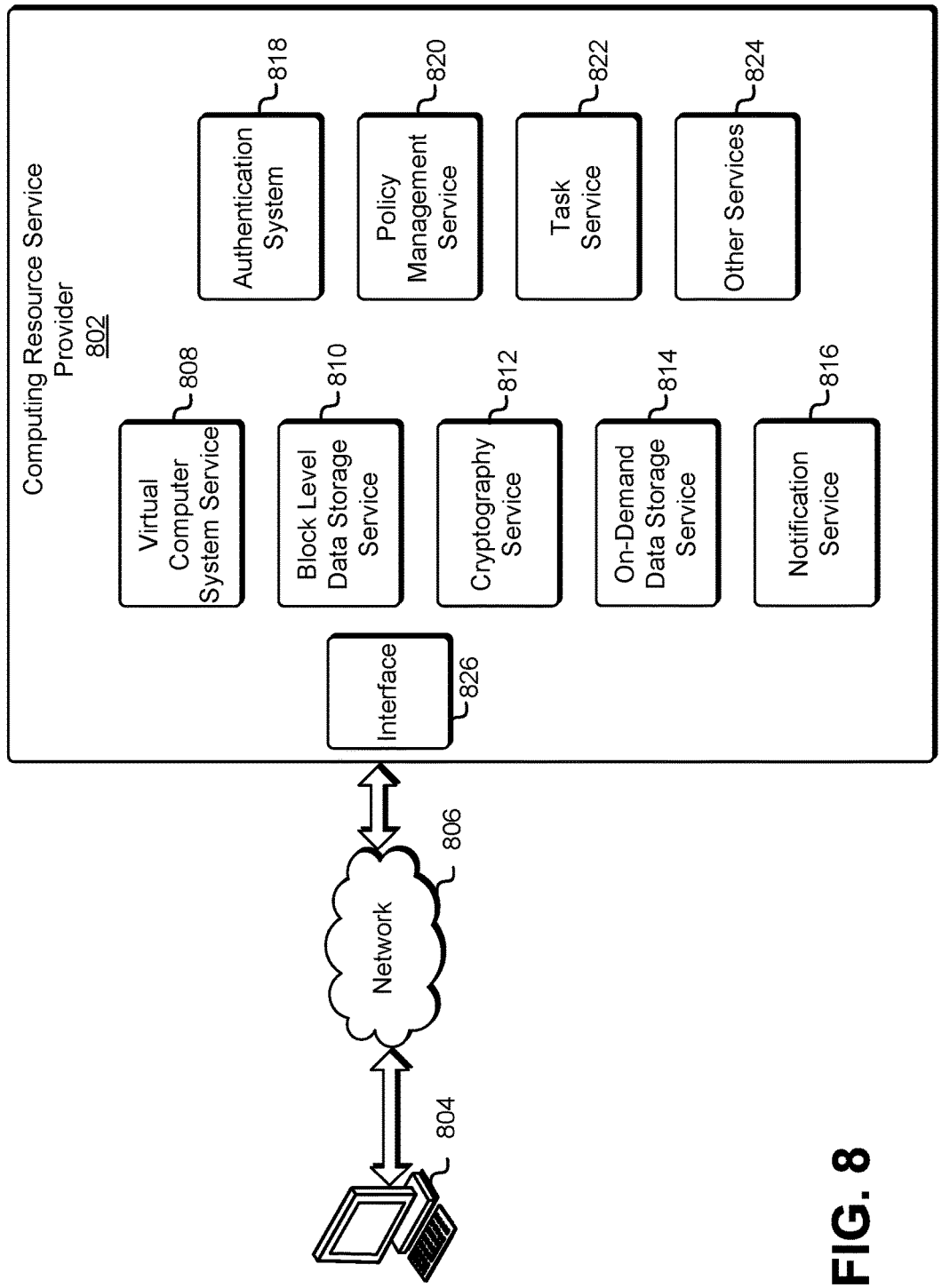
FIG. 8 illustrates an example of a customer connected to a computing resource service provider.

The computing resource service provider 108 may be a computing resource service provider similar to the computing resource service provider 802 described in conjunction with FIG. 8, and may provide one or more services accessible over a network, including a virtual computer system service, on-demand data storage services, and archival data storage services. The computing resource service provider 108, in an embodiment, provides one or more services on behalf of customers corresponding to the calling application 106. As one example, the computing resource service provider 108 may be a bank where the host 102 is a computer system utilized by customers of the bank to enable the customers to access account information or enable the customers to perform financial transactions using the computing resources of the bank. As another example, the host 102 may be one of many computing devices of an organization that utilizes resources of the computing resource service provider 108 as part of the organization's infrastructure. For instance, the host 102 may be utilized to programmatically manage or otherwise access web servers, data storage servers, or virtual computer instances, where the hardware for the servers and instances are physically hosted by the computing resource service provider 108. It should be noted that, while various examples are presented in this disclosure for illustration purposes, the scope of the present disclosure is not limited to such examples.

Figure 2:
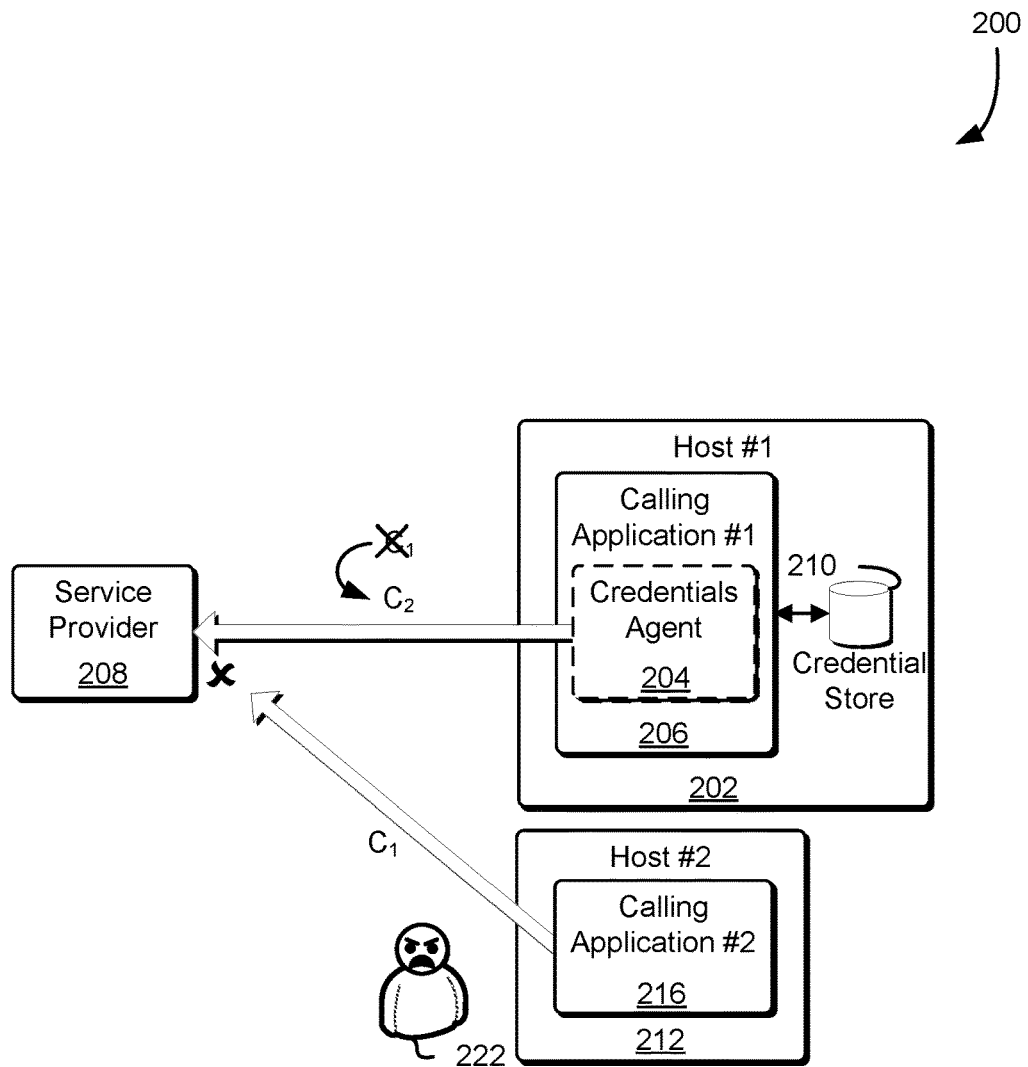
FIG. 2 illustrates an example of an embedded credentials agent in accordance with an embodiment.

FIG. 2 illustrates an aspect of an environment 200 in which an embodiment is practiced. Specifically, FIG. 2 depicts an example of an integrated credentials agent 204; that is, the integrated credentials agent 204 may be a credentials agent similar to the credentials agents 104 and 304 of FIGS. 1 and 3 respectively, except that the security credential management logic of the integrated credentials agent may be built into the first calling application 206 rather than being a standalone application. The example illustrated by FIG. 2 further depicts a situation where the first calling application 206 on a first host 202 has rotated an old credential $C_1$ to a new credential $C_2$ with a computing resource service provider 208. Due to the rotation of credentials, a second calling application 216 on a second host 212 is no longer able to use the old credential $C_1$ with the computing resource service provider 208. Note that the labels $C_1$ and $C_2$ are used for illustration purposes only to represent a first credential and a second credential respectively.

Note that, while the integrated credentials agent 204 is depicted in FIG. 2 as integrated with the first calling application 206, the functionality described in reference to the integrated credentials agent 204 may also be present in other embodiments where the credentials agent is a standalone application configured to manage credentials for one or more calling applications. The first host 202 may be any host computer system suitable for hosting one or more applications, such as the host 102 described in conjunction with FIG. 1. The first host 202 may include a first data storage 210, which may be credential store similar to the credential store 110 described in reference to FIG. 1, and may also include additional hardware, such as buses, input/output ports, and networking equipment. The first host 202 may be configured to host applications, such as the first calling application 206, that may utilize services and resources from the computing resource service provider 208.

The computing resource service provider 208 may be a computing resource service provider similar to the computing resource service provider 802 and/or the computing resource service provider 108 described in conjunction with FIGS. 8 and 1, respectively. The first host 202 may be a computer system configured to access one or more services and/or resources of the computing resource service provider 208, similar to the host 102 of FIG. 1. The first calling application 206 may be any executable computer application with the integrated credentials agent 204 and configured to communicate with one or more services of the computing resource service provider 208. For example, the first calling application 206 may be an application configured to read and/or write data to a data storage service of the computing resource service provider 208, such as a mapping application configured to read map data from a database stored with the data storage service. In order for the computing resource service provider 208 to be able to verify that the first calling application 206 is authorized to have its service request (e.g., read request, write request, etc.) fulfilled, the first calling application 206 may supply, as its credentials, an identity (such an a unique identifier for the application) and a password or other secret key. In order to reduce a risk of compromise of the password, the integrated credentials agent 204 may cause the password to be changed.

In some cases the first calling application 206 may be configured to periodically determine, from the integrated credentials agent 204, whether it has the most-recent credentials and, if not, retrieve the most-recent credentials from the integrated credentials agent 204. In other cases, the first calling application 206 may retrieve the credentials needed to access resources of the computing resource service provider 208 from the integrated credentials agent 204 or the first data storage 210 each time. Retrieving the needed credential each time thereby ensures that the first calling application 206 always attempts to access the computing resource service provider resources with the most-recent credentials.

The integrated credentials agent 204 may be an application configured to manage and rotate credentials of the first calling application 206. For example, the integrated credentials agent 204 may be configured to change the password of the first calling application 206 every 90 days. In some embodiments, the new password is generated by the integrated credentials agent 204 itself, whereas in other embodiments the new password is generated and provided by the computing resource service provider 208. Similarly, in some embodiments, the integrated credentials agent 204 is configured to determine when credentials should be rotated. In such embodiments, the integrated credentials agent 204 notifies the computing resource service provider 208 that it is time for credentials to be rotated, and either generate the new credentials or retrieve the new credentials from the computing resource service provider 208. In some embodiments, the integrated credentials agent 204 simply generates the new credentials as needed and notify the computing resource service provider 208 that the new credentials are to replace the old credentials. Alternatively, in other embodiments, the computing resource service provider 208 notifies the integrated credentials agent 204 that it is time to rotate credentials or simply provide the integrated credentials agent 204 with notice that the new credentials are to replace the old credentials. In any case, the credentials may be rotated without human intervention.

The integrated credentials agent 204 may store the current set of credentials in the first data storage 210. Then, when the current credentials are changed to new credentials, the new credentials may be stored in the first data storage 210 by appending the new credentials to the first data storage 210 or overwriting the previous credentials in the first data storage 210. In some embodiments, credential rotation is triggered according to a timer (e.g., triggered after a determined time has passed). Additionally or alternatively, in other embodiments, the password is caused to change in response to a demand from a user, the computing resource service provider 208, or an authentication system, such as the authentication system 818 of FIG. 8. Additionally or alternatively, in still other embodiments, the credential rotation is triggered after a credential has been used for a threshold number of uses/authentication calls. The first data storage 210 may be a data store for storing one or more credentials for the first calling application 206. Among other examples, the first data storage 210 may be a database stored on a hard drive of the first host 202, may be stored in random access memory of the first host 202, or may be stored as encrypted text in a file on a remote host.

Similar to the first host 202, the second host 212 may be any host computer system suitable for hosting one or more applications. The second host 212 may also include a second data storage 220 and may be configured to host applications, such as the second calling application 216, that may attempt to utilize services and resources from the computing resource service provider 208. Likewise, the second calling application 216 may be an executable computer application configured to communicate with one or more services of the computing resource service provider 208. Similar to the first calling application 206, the second calling application 216 may have a second data storage 220 storing the credentials that the second calling application 216 uses for access to a service of the computing resource service provider. Note that the second calling application 216 is not shown to have an integrated credentials agent, as the second calling application 216 is intended to represent an application that may have been hard-coded to use a particular set of credentials, and thereby may not be easily rotated. Alternatively, the second calling application 216 could represent an application belonging to a malicious user 222 or other entity which has compromised the credential $C_1$.

Therefore, the second calling application 216 illustrates an example of an application without a valid credentials agent attempting to access a service of the computing resource service provider 208 using the old credential $C_1$. As illustrated in FIG. 2, during an initial period, the first calling application 206 and the second calling application 216 may both be using a password (credential $C_1$) to access the same resource provided by a service of the computing resource service provider 208. However, after some time, the integrated credentials agent 204 may determine to change the password (credential $C_1$) to a new password (credential $C_2$). In doing so, the integrated credentials agent 204 may communicate to the computing resource service provider 208 that the credential should be rotated from the credential $C_1$ to the new credential $C_2$. In some embodiments, the integrated credentials agent 204 generates the new credential $C_2$ itself, whereas in other embodiments, the computing resource service provider 208 provides the integrated credentials agent 204 with the new credential $C_2$, either through the service being called or another service, such as the authentication system 818 of FIG. 8.

Thereafter, the credential $C_1$ may be deactivated and the first calling application 206 may continue to access the resource of the computing resource service provider 208 as usual using the new credential $C_2$. However, when the second calling application 216 attempts to access the resource of the computing resource service provider 208 using the credential $C_1$, access to the resource may be denied. By denying applications attempting to use the credential $C_1$, the computing resource service provider 208 may minimize the risk presented by hard-coding credentials within applications and the risk of unauthorized users attempting to use old credentials to gain access to restricted resources.

Note that, in some embodiments, the credential $C_1$ is not be immediately deactivated. For example, the determination of when the old credential should be retired/deactivated may be made at the computing resource service provider 208. For example, the integrated credentials agent 204 may notify the computing resource service provider 208 that it is time for a new credential $C_2$, and the first calling application 206 may begin using the new credential $C_2$. However, for a period, the computing resource service provider 208 may permit other applications, such as the second calling application, to gain access to the resource using the old credential $C_1$. For example, if a credential has been rotated from $C_1$ to $C_2$, subsequent use of the old credential $C_1$ would be an unexpected state. In the context of the present disclosure, an "expected state" may refer to a situation where a first credential is rotated to a second credential and calling applications discontinue using the first credential within an expected time. In other words, an expected state may refer to a credential rotation where everything has gone as planned. In some examples, an "unexpected state" may refer to a situation where some configuration or security issue has arisen that authorized personnel should be made aware of, such as users or applications that continue to use a first credential beyond an expected time after the first credential has been rotated.

The computing resource service provider 208 may permit the requesting application, such as the second calling application 216, to access the requested resource but may log the origin of the requestor (e.g., an internet protocol address or address range, and/or other identifying information) and may raise an alert or otherwise notify security personnel of the unexpected state. In some examples, to "raise an alert" may refer to presenting a visual and/or audible notice that something has occurred. Examples of raising an alert include, causing a popup window to appear in a security monitoring application, flashing icons or screens, audible beeps or buzzes, and paging, sending an e-mail message, recording a message to voicemail, or text messaging designated security personnel. Regardless of whether the old credential is kept alive for a period or not, usage of the old credential $C_1$ may be logged and/or otherwise tracked (e.g., to attempt to identify non-compliant applications using hard-coded credentials or to attempt to determine the identity and/or location of a malicious user 222.

Figure 3:
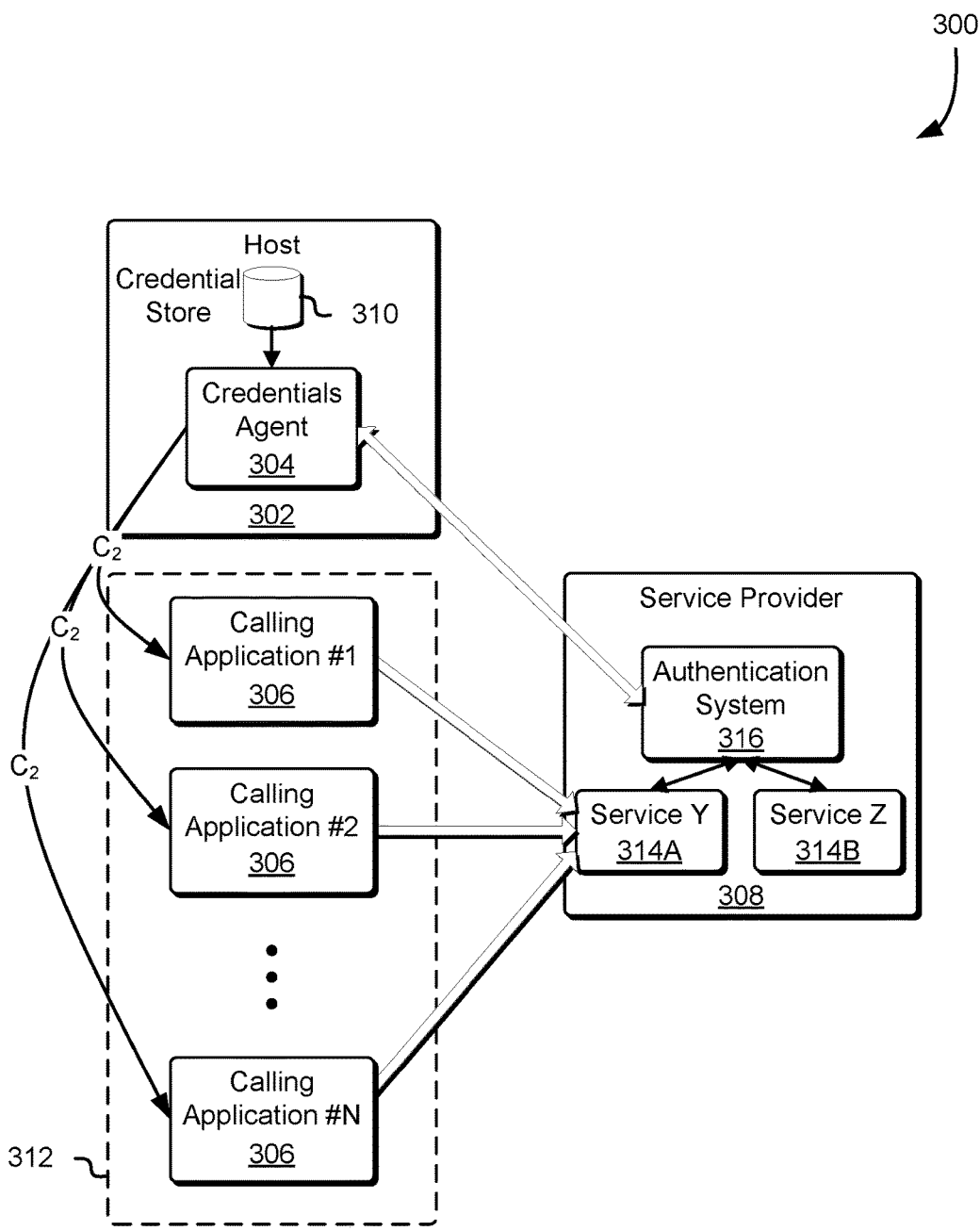
FIG. 3 illustrates an example of a credentials agent in accordance with another embodiment.

FIG. 3 illustrates an aspect of an environment 300 in which another embodiment may be practiced. As illustrated in FIG. 3, the environment 300 may include credentials agent 304 running on a host 302; the credentials agent 304 being configured to rotate credentials for one or more calling applications 306 that access a service 314A of services 314A-14B of a computing resource service provider 308. The host 302 may be any host computer system suitable for hosting one or more applications, such as the host 102 described in conjunction with FIG. 1. The host 302 may include a data storage 310, which may be credential store similar to the credential store 110 described in reference to FIG. 1, and may also include additional hardware, such as buses, input/output ports, and networking equipment.

The credentials agent 304 of FIG. 3 may be a standalone application running on the host 302. The credentials agent 304 may be configured to run continuously, for example as a background service or application, or may be configured to launch and run periodically (e.g., every third Sunday of every month at 1:30 AM). The credentials agent 304 may be configured to manage and rotate credentials only for a particular type of calling application and/or only for a particular computing resource service provider service, in which case the credentials agent 304 may be a set of one or more credentials agents. Each credentials agent of the set of credentials agents may be configured to manage and rotate credentials for a different type of application and/or computing resource service provider service. Alternatively, the credentials agent 304 may be configured to manage and rotate credentials for multiple types of calling applications and/or multiple computing resource service provider services. In such a case, the credentials agent 304 may actually be a function of a service of the computing resource service provider 308 (e.g., one of the other services 824 of FIG. 8, or a part of the authentication system 818) and the host 302 may be a computer system in a distributed computing system of the computing resource service provider 308. In some cases where there may be different sets of calling application instances (e.g., a set for instances of a first calling application, another set for instances of a second calling application different from the first calling application, etc.), each set may have a dedicated and separate credentials agent 304 configured to manage rotation of credentials for that set. In other cases, there may be one or more credentials agents (e.g., for load balancing or fault isolation purposes) that jointly manage some or all sets of calling application instances. The credentials agent 304 may store the current set of credentials in the data storage 310, which may be a database residing on a hard drive of the host 302, may be stored in random access memory of the host 302, or may be stored as encrypted text in a file on a remote host.

As has been noted, in some embodiments, the credentials agent 304 generates the new set of credentials, cause the old set of credentials to be deactivated, and determine when it is time to rotate credentials without being instructed to do so by services of the computing resource service provider 308. In other embodiments, the services of the computing resource service provider 308 prompts the credentials agent 304 when it is time to rotate the credentials, generate the new set of credentials, and/or cause the old set of credentials to be deactivated. In some embodiments, all requests for access to resources of the computing resource service provider 308 are first be routed through a common service (e.g., the authentication system 818 of FIG. 8) that authenticates such requests. In these embodiments, this central service may be responsible for notifying the credentials agent 304 and/or the calling application 306 that it is time to rotate credentials. Likewise, in some embodiments, this common service provides for generating the new set of credentials and deactivating the old set of credentials.

In some embodiments, the credentials agent 304 informs the computing resource service provider (or the authentication system may notify the services of the computing resource service provider) that the calling application has a certain credential rotation policy (e.g., a policy that dictates rotating credentials every 30 days). By referencing the credential rotation policy, the services called by the calling application are thereby notified to expect credential rotation to occur according to the credential rotation policy and not otherwise. In such embodiments, the services is configured to notify the credentials agent 304 or the authentication system if it detects activity not in conformance to the policy (such as the calling application not rotating its credentials according to schedule).

The credentials agent 304 may make authenticated application programming interface calls or remote procedure calls to a service or authentication system of the computing resource service provider 308 to give notice of the new credentials or as a request for new credentials to be generated. Similarly, the credentials agent 304 may make authenticated application programming interface calls or remote procedure calls to cause old credentials to be deactivated. Note too that the credentials agent 304 may have its own set of credentials with which it communicates with services of the computing resource service provider. In some cases, this set of credentials may be a different set of credentials than would be used by the one or more calling applications 306 and may or may not be rotated in the same manner as the credentials of the one or more calling applications 306. In other cases, it may be that the credentials agent 304 uses the same set of credentials as the one or more calling applications 306. Note as well that the credentials used by the credentials agent 304 and the one or more calling applications 306 may be the same or different credentials for each of the services 314A-14B of the computing resource service provider 308.

The computing resource service provider 308 may be a computing resource service provider similar to the computing resource service provider 802 and/or the computing resource service provider 108 described in conjunction with FIGS. 8 and 1, respectively. The one or more calling applications 306 may be individual applications that comprise a cluster 312 of applications. As in other embodiments, the one or more calling applications 306 is any manner of applications configured to access resources of the computing resource service provider 308. In some embodiments, the one or more calling applications 306 in the cluster 312 are multiple instances of the same application. In other embodiments, the one or more calling applications 306 are different applications configured to share the same credentials. The one or more calling applications 306 may each be running on their own host (e.g., redundant web or data servers), may be sharing the same host with one or more other calling applications 306 but running in separate virtual machine instances, or may be sharing the same virtual machine instance with one or more other applications 306.

In still other embodiments, the one or more calling applications 306 are configured to have their own separate and distinct credentials. Furthermore, in some embodiments, the credentials agent 304 is configured to manage multiple clusters of the same or different applications. In other embodiments, different instances of the credentials agent 304 are assigned to rotate and manage different clusters of calling applications. In these embodiments, the one or more of the different credentials agents may execute on one or more different hosts using one or more different data storages than other credentials agents.

Likewise, one or more of the hosts of the one or more calling applications 306 may be executing on hosts of a distributed computing system and may be either local to or remote from each other. The services 314A-14B may be any service providing access to resources made available by the computing resource service provider 308, and may include one or more of the resources 808-24 described in conjunction with FIG. 8, such as a virtual computer system service, on-demand data storage service, or as archival data storage service. In this manner, the credentials agent 304 may provide a mechanism for efficiently managing and rotating credentials as needed in a networked system comprising a large number of different computer systems.

Periodically, the one or more calling applications 306 may make a call to the credentials agent 304 for the most-recent credentials, and the credentials agent 304 may supply the most-recent credentials to the requesting calling application. Additionally or alternatively, the credentials agent 304 may push new credentials to the one or more calling applications 306 when credentials are rotated. For example, in a first state, the calling applications 306 1-N may be accessing a resource of the service 314A of the computing resource service provider 308 using a first set of credentials ($C_1$). When it becomes time to rotate credentials, the credentials agent 304 may communicate with an authentication system 316 of the resource service provider 308 to cause the first set of credentials $C_1$ to be rotated to a second set of credentials ($C_2$). Once the credentials agent 304 has the second set of credentials $C_2$, the credentials agent 304 may propagate the second set of credentials $C_2$ to the one or more calling applications 306. Note that in some implementations, the credentials agent 304 may propagate the second set of credentials $C_2$ by storing the second set of credentials $C_2$ in a credential store accessible to the one or more calling applications 306.

In some embodiments, when the services 314A-14B receive an authentication request for a calling application, the services 314A-14B communicate with the authentication system 316 to verify the identity of the calling application. In other embodiments, the authentication system 316 may alternatively provide the credentials $C_2$ (or information usable to authenticate credentials $C_2$) to any of the services 314A-14B that would use authenticate the credentials $C_2$. Thereafter, each of the one or more calling applications may use the second set of credentials $C_2$ for access to the resource of the service 314A.

In embodiments where the one or more calling applications 306 are configured to query the credentials agent 304 for the most-recent credentials periodically, there may be a delay before the second set of credentials $C_2$ are fully propagated to all of the one or more calling applications 306. As an example, a host for one of the calling applications may have been offline for repairs or maintenance when credentials were rotated or may have been restored from a backup, and when the calling application comes back online, it may temporarily still be using the first set of credentials. In this situation, keeping the old credential $C_1$ active for a period may permit valid calling applications to have sufficient time to rotate their credentials from the first set of credentials $C_1$ to second set of credentials $C_2$. In some cases, based on how long a host or calling application may have been offline and the credential rotation schedule, when a host or calling application comes back online, it may have missed one or more rotations of the credentials. In such cases, the formerly offline host or calling application may query the credentials agent 304 for the most-recent set of credentials and, upon determining that its credentials are out of date, the host may update its credentials to the most-recent set of credentials. Note, while FIG. 3 depicts an example where the one or more calling applications 306 share the same credentials, embodiments are contemplated where each of the one or more calling applications 306 has separate and distinct credentials. For example, "Calling Application #1" may be rotated from a first credential to a second credential at one time, and, at a different or same time, "Calling Application #2" may be rotated from a third credential to a fourth credential, and so on.

In such a situation where one of the calling applications, such as "Calling Application #2," does not properly retrieve the new set of credentials, the calling application may attempt to access the resource of service 314A using the first set of credentials $C_1$. The service 314A may note this as an unexpected state and raise an alert that "Calling Application #2" did not properly rotate its credentials. Based on this alert, the computing resource service provider may determine whether the calling application is malfunctioning, has hard-coded credentials, or may be a malicious software program or user.

Figure 4:
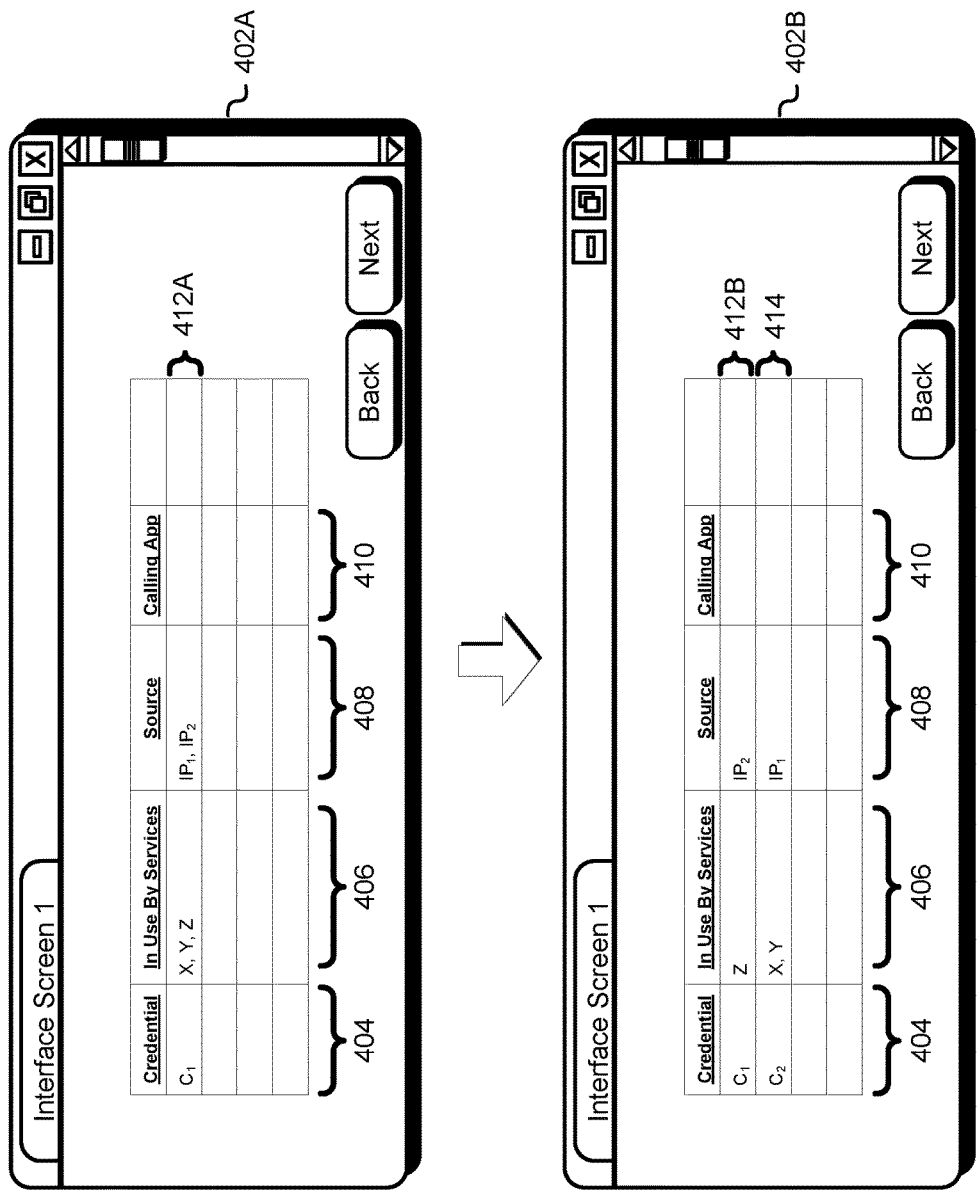
FIG. 4 illustrates an example of an interface screen in accordance with an embodiment.

FIG. 4 illustrates example interface screens 402A-02B of an embodiment of the present disclosure. The interface screen 402A represents a screen that tracks credential use before credential rotation from credential $C_1$ to credential $C_2$. The interface 402B represents a screen that has tracked credential use after credential rotation from credential $C_1$ to credential $C_2$. Note that the labels $C_1$ and $C_2$ are used for illustration purposes only to represent a first credential and a second credential respectively, and, in practice, any meaningful label may be used. Although the actual credential itself may be displayed, it may be advisable for network security purposes to obfuscate, truncate, or otherwise provide some representative label (e.g., $C_1$, $C_2$, etc.) for the credential to reduce the risk of the actual credential becoming compromised.

The credential column 404 may be used to display which credentials are in use. The services column 406 may be used to display which services are using the respective credentials. The source column 408 may be used to record the source of authorization requests for the respective services. The source may be any descriptive information that represents an actual or approximate origin of the request. As a non-exhaustive list of examples, the source may be descriptive identifying information provided with the request such as an internet protocol address (as represented by $IP_1$ and $IP_2$, although in practice an actual internet protocol address may be shown), a list of internet protocol addresses, an internet protocol address range (e.g., "192.167.0.0-100"), information identifying of one or more intermediary system that pass proof of the credentials along to a destination service, a netmask, an autonomous system number, an identity of a virtual private cloud, a session identifier, user agent string, Zone Improvement Plan code, or a geolocation.

In the interface screen 402A, it is seen that only credential $C_1$ is in use, and the credential $C_1$ is being used by provider services "X," "Y," and "Z." Also in the interface screen 402A, requests for authorization using the credential $C_1$ can be seen as coming from internet protocol address $IP_2$. In some embodiments, an identity of a calling application, if known, will be listed as well, such as in the caller column 410. By logging the identity of calling applications, network security personnel may be able to identify non-compliant applications, such as applications with hard-coded credentials. Note that the column categories depicted are for illustration purposes only, and in an implementation, additional or different categories may be tracked and/or displayed. Furthermore, alternative visualizations beyond table-based visualizations are also contemplated; for example, the credential data may be displayed in a graph or interactive tree format.

After the credential $C_1$ has been rotated to credential $C_2$, it can be seen from the credential column 404, the services column 406, and the source column 408 in row 414 of the interface screen 402B that requests for authorization with services "X" and "Y" from calling applications at internet protocol address $IP_1$ have successfully been transitioned to the new credential, $C_2$. However, it can also be seen from row 412B of the interface screen 402B that calling applications at internet protocol $IP_2$ are still attempting to access service "Z" using the old credential $C_1$. Depending on the particular embodiment and the amount of time that has passed since the credential rotation, the continued use of credential $C_1$ may not be unexpected; that is, there may be some reasonable period of delay before the calling applications at $IP_2$ are updated to the new credential $C_1$. On the other hand, in other embodiments or where the use of $C_1$ has continued beyond a reasonable period, the interface screen 402B serves to give network security personnel notice that an unexpected state has occurred, and that the calling application or applications at $IP_2$ may be malfunctioning, may have hard-coded credentials, or may be an unauthorized user or application attempting to gain access to restricted resources.

Figure 5:
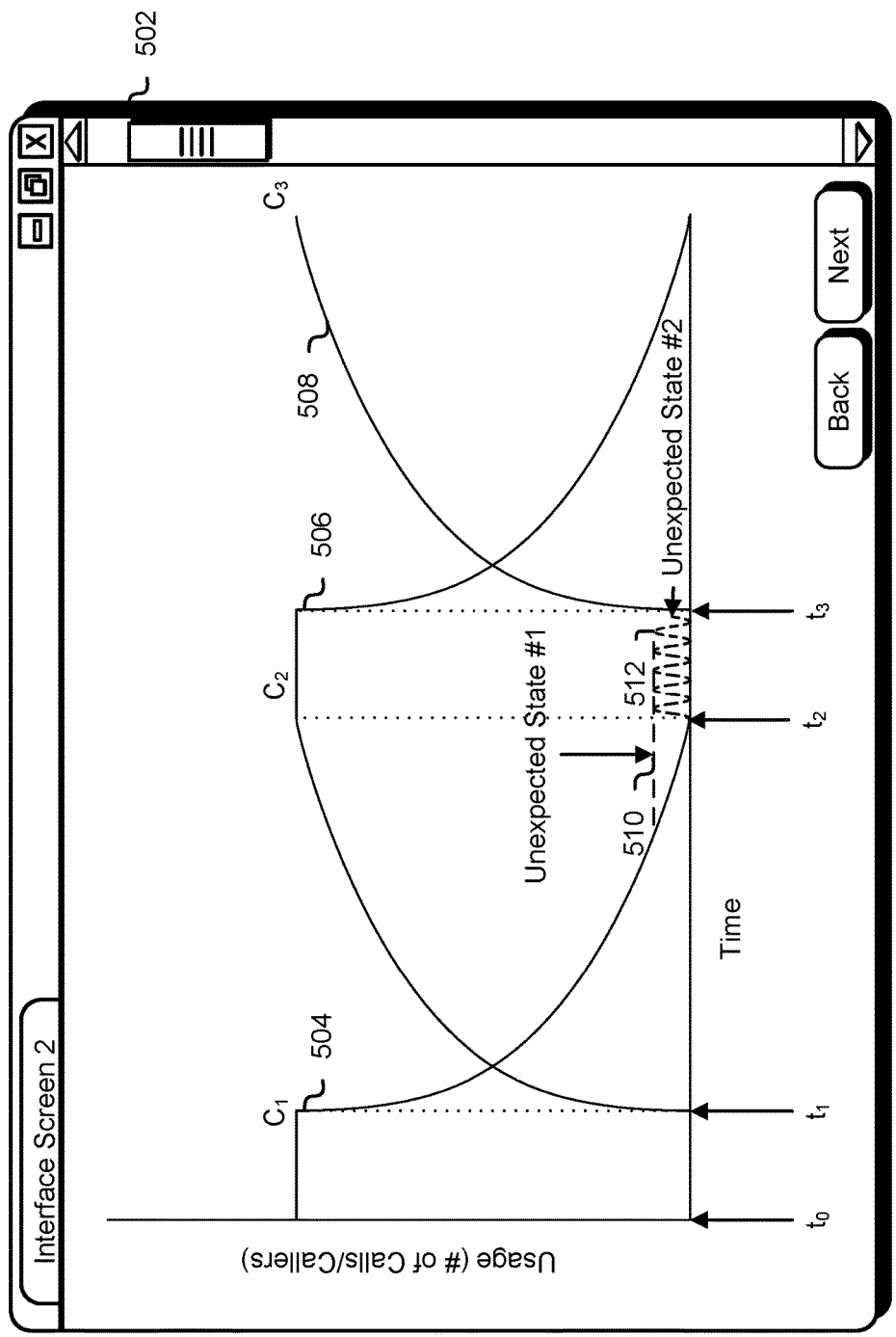
FIG. 5 illustrates an example of another interface screen in accordance with an embodiment.

FIG. 5 illustrates an example interface screen 502 of an embodiment of the present disclosure. The interface screen 502 represents a screen that may monitor credential use over time. In the example interface screen 502, credential $C_1$ is in use by calling applications at an initial time $t_0$. Then, at time $t_1$, the credential $C_1$ is rotated to credential $C_2$, and, as a result, usage of credential $C_1$, represented by line 504, can be seen to decrease while usage of credential $C_2$, represented by line 506, can be seen to correspondingly increase. Likewise, when credential $C_2$ is rotated to credential $C_3$ at time $t_3$, it can be seen that line 506 decreases while usage of credential $C_3$, represented by line 508, increases correspondingly. The system or network security personnel may determine to deactivate a credential when use of that credential decreases to zero or when usage decreases below a certain threshold.

The interface screen 502 also illustrates a couple of possible unexpected states. Line 510 reflects a first unexpected state that may occur if one or more applications continue to use old credential $C_1$ on a constant basis; that is, rather than line 504 decreasing to zero, the line 504 may decrease to some level above zero, representing that the credential $C_1$ is still being used by one or more applications. Likewise, line 512 reflects a second unexpected state that may occur if the old credential $C_1$ is still being used sporadically; that is, the line 504 may decrease to a usage level of zero, but intermittently some entity, such as a human, is still detected as attempting to use the old credential $C_1$. By glancing at this graphical visualization, network security personnel may have notice that the system is in an unexpected state and that some applications may not have rotated their credentials properly or that an unauthorized user or application may be attempting to access restricted resources. In some cases, the interface may be configured to notify network security personnel of unexpected states using other methods, such as by pager, text messages, and/or e-mail messages.

Note also that there may be a plateau, such as the plateau of line 506 between times $t_2$ and $t_3$, where the credentials are not rotated. The plateau may persist for varying lengths of time, depending on the network policy of the particular implementation. For example, if the policy requires credentials to be rotated every 90 days, the plateau may persist for nearly that length of time rather than the short period depicted in FIG. 5. Likewise, if the policy requires application credentials to be rotated hourly, the plateau may be much shorter. The plateau may vary based on whether the policy dictates that credentials be rotated after they have been used a specified, or whether the policy dictates that the credentials may be rotated according to some stochastically-determined scheme.

Figure 6:
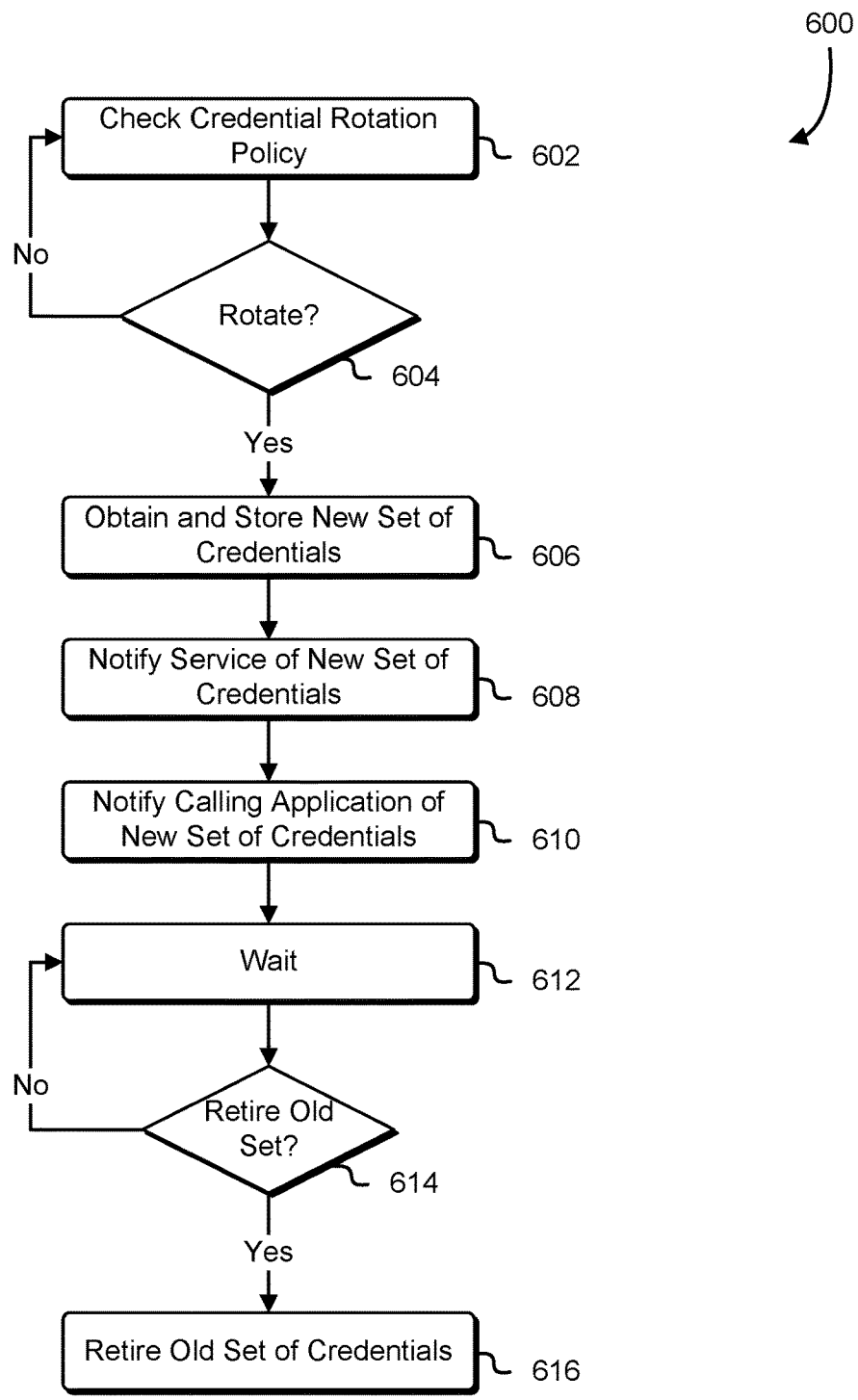
FIG. 6 is a flow chart that illustrates an example of credentials agent rotating credentials of a calling application in accordance with an embodiment.

FIG. 6 is a flow chart illustrating an example of a process 600 that may be followed by a credentials agent in accordance with various embodiments. The process 600 may be performed by any suitable system such as a server in a data center, multiple computing devices in a distributed system of a computing resource service provider, or any electronic client device such as the electronic client device 902 described in conjunction with FIG. 9. The process 600 includes a series of operations wherein the credentials agent determines that it is time to rotate a set of credentials, causes a new set of credentials to be generated, notifies the pertinent entities of the new credentials, and retires the old set of credentials at an appropriate time.

In 602, the credentials agent obtains a credential rotation policy directed to credentials of one or more calling applications. As noted, calling applications may be any application that access resources of a service of a computing resource service provider. The credential rotation policy may be a schedule or set of rules that determine when a set of credentials should be rotated to a new set of credentials. Thus, it is concerning this credential rotation policy that the system performing the process 600 may determine, in 604, whether to rotate a set of credentials. For example, if the credential rotation policy specifies that the set of credentials should be rotated every Thursday of each week and the credentials agent perceives that the day of the week is Thursday and that it has not rotated the set of credentials this week, the credentials agent may determine to rotate the set of credentials. Similarly, if the credential rotation policy specifies that the set of credentials should be rotated at random according to a stochastic determination scheme, the credentials agent may determine at random to rotate the set of credentials. Similarly, if the credential rotation policy specifies that the set of credentials should be rotated after the set of credential has been used a threshold number of times, the credentials agent may determine to rotate the set of credentials at or after the set of credentials has been used that threshold number of times. As has been noted, the credentials agent may manage multiple sets of credentials for multiple clusters of calling applications, and thus each set of credentials may have different associated credential rotation policies and may be rotated independent of other sets of credentials.

In some cases, the credentials agent may be directed to rotate the set of credentials by an outside entity, such as by network security personnel of the computing resource service provider or by the user of the calling application; in such a case, the credentials agent may omit the operations of 602 and the system performing the process 600 may proceed directly to 606. In 606, the credentials agent may obtain a new set of credentials. In some embodiments, the credentials agent generates the new set of credentials itself. In other embodiments, the credentials agent submits a request for the new set of credentials from the computing resource service provider. In still other embodiments, the new set of credentials is generated and provided to the credentials agent by another application configured to generate new credentials for the credentials agent. Once the new set of credentials have been obtained, the credentials agent may store the new set of credentials locally, such as in a data store on the local computer system. In other embodiments, the credentials agent pushes out the new set of credentials to one or more designated calling applications, and retains, in a memory or a data store, proof of the version of the new set of credentials, such as a cryptographic hash of the new set of credentials. In this manner, the new set of credentials may be able to confirm whether the set of credentials of an inquiring calling application are current without reference to the actual net set of credentials. In other embodiments, the new set of credentials is stored with the computing resource service provider, such as in a data store of a data service of the computing resource service provider.

In 608, once the new set of credentials are generated and in the possession of the credentials agent and/or stored in the data store, the credentials agent may notify the pertinent service of the computing resource service provider that the service may begin accepting the new set of credentials when authorizing access requests by calling applications corresponding to the new set of credentials. In some embodiments, the notified service continues to authorize requests using the old set of credentials for a time or until directed to stop authorizing requests using the old set of credentials, whereas in other embodiments, the notified service refuses to authorize requests using the old set of credentials in favor of authorizing requests using the new set of credentials.

In 610, the credentials agent may notify the one or more calling applications that had been using a previous set of credentials that a new set of credentials have been generated. In some embodiments, the credentials agent pushes the new set of credentials out to the one or more calling applications needing the new set of credentials concurrently, in series with, or in lieu of the notification. In other embodiments, the credentials agent notifies the pertinent calling applications of the new credentials and the pertinent calling applications may retrieve the new set of credentials from the data store of 606. In still other embodiments, the credentials agent notifies the calling application that it is time to rotate their old set of credentials, and the calling applications may generate a new set of credentials itself (in such a case, omitting the operations of 608) or the calling applications may obtain the new set of credentials directly from a service of the computing resource service provider.

In 612, the system performing the process 600 may allow an amount of time to pass to enable the pertinent calling applications to receive and begin using the new set of credentials. In a distributed system having many calling applications, there may be some time before all calling applications have received and have switched over to use the new set of credentials. Thus, in 614, the system performing the process 600 determines whether it is time to deactivate the old set of credentials. In some cases, the determination may be made when the usage of the old set of credentials drops to or below a certain threshold, such as zero usage. In other cases, the determination may be made after a certain amount of time has passed, such as 48 hours. In other cases, the determination to deactivate/disable the old set of credentials may be made as soon as the new set of credentials are made available to the calling applications and the appropriate service of the computing resource service provider, in which case the operations of 612 may be omitted.

In even other cases, the system performing the process 600 may allow a specified amount of time to pass, and then call an authentication service to query whether the old credentials are still in use. In such a case, if the old credentials are still in use, the system performing the process 600 may allow more time to pass and query the authentication service again. This process may repeat a certain number of times until either the old credentials cease to be used by calling applications, in which case the system performing the process 600 proceeds to 616, or, after repeating a threshold number of times, may alert network security personnel to the existence of this unexpected state. In still other cases, the old set of credentials may not be expressly disabled, and usage of the old set of credentials may simply be tracked.

Note that if the usage of the old set of credentials does not drop to zero within an expected time, or, at some time after usage drops to zero, usage of the old set of credentials is detected, an alert may be raised (such as a pop up notification on a credentials monitoring interface of network security personnel of the computing resource service provider) that an unexpected state has occurred. Finally, in 616, the old set of credentials may be retired/disabled/deactivated. In some embodiments, deactivation is caused by the credentials agent instructing, such as through an application programming interface call, a service (such as the authentication system 818 of FIG. 8) of the computing resource service provider that the old set of credentials are no longer acceptable for authorizing the calling applications. In such cases, requests for access accompanied by the old set of credentials may be denied by the computing resource service provider.

In some cases, the operations of 616 may further comprise removing the old credentials from the data store of 606 or otherwise indicating that the old credentials in the data store are outdated. In other embodiments, the service of the computing resource service provider determines when to retire the old set of credentials. In certain embodiments, the credentials agent acts as a proxy between the calling application and the service of the computing resource service provider, and, in such cases, all credential exchanges may be made by the credentials agent acting for the calling application. In such cases, when the credentials agent determines to deactivate the old set of credentials, it may simply stop using the old set of credentials and only use the new set of credentials. Note that one or more of the operations performed in 602-16 may be performed in various orders and combinations, including in parallel.

Figure 7:
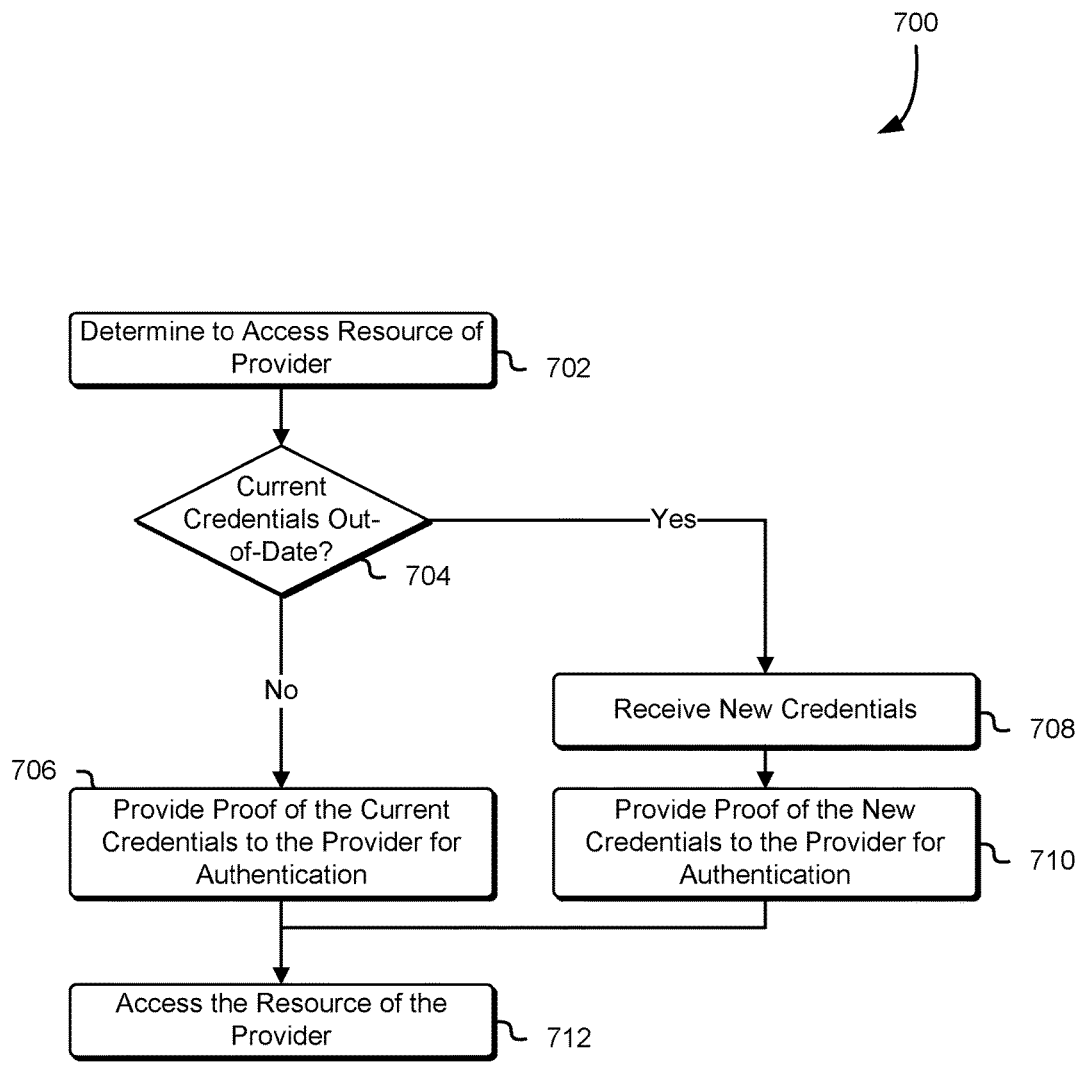
FIG. 7 is a flow chart that illustrates an example of a calling application having its credentials rotated in accordance with an embodiment.

FIG. 7 is a flow chart illustrating an example of a process 700 for a rotating credentials of a calling application in accordance with various embodiments. The process 700 may be performed by any suitable system such as a server in a data center, multiple computing devices in a distributed system of a computing resource service provider, or any electronic client device such as the electronic client device 902 described in conjunction with FIG. 9. The process 700 includes a series of operations wherein a system executing a calling application determines whether it has current or outdated credentials for the calling application, and, if outdated, obtains new credentials. Note that not all embodiments of the present disclosure may follow the same process outlined in FIG. 7; for example, in certain embodiments, the credentials agent acts as a proxy between the calling application and a service of the computing resource service provider and all credentials exchanges for the calling application may go through the credentials agent. In such embodiments, the operations of 704-06 are omitted as the credentials agent may always provide the most recent credentials to the computing resource service provider service for the calling application.

In 702, the calling application system (i.e., the system executing the calling application) determines to access a resource of a service of a computing resource service provider. The calling application may be any application that accesses one or more resources of the computing resource service provider. For example, the calling application could be a mapping application that, when executed, accesses geolocation data stored on a data store of a data storage service of the computing resource service provider. As another example, the calling application could be a point of sale application that, as it is executing, submits customer payment information to a payment processing application running on a virtual machine of a virtual computer system service of the computing resource service provider. As still another example, the calling application could be a collection of web applications of an online marketplace hosted on multiple virtual machines of a virtual computer system service of the computing resource service provider that, as it executes, utilizes one or more data stores of a data storage service provided by the same or different computing resource service provider. Therefore, the determination to access the resource of the computing resource service provider could be triggered by any of a variety of factors, including having received a request to retrieve data (e.g., such as may be in response to input from a user), having received data for storage or processing, or as part of a routine process (e.g., downloading the most current map data every 24 hours, etc.).

In 704, the calling application system determines whether the set of credentials the calling application system currently possesses are out of date. In this context, the set of credentials of the calling application may be credentials usable by a computing resource service provider to authenticate calls (i.e., requests) made by the calling application system to a service of the computing resource service provider. Whether an entity, such as the calling application system, is authorized to have a request fulfilled by the service of the computing resource service provider may be determined by an application programming interface call that includes a digital signature generated using a credential of the entity. For example, a calling application system may use a private key to digitally sign a request to a service, whereupon the service forwards the digital signature and signed message to an authentication system (e.g., the authentication system 818 of FIG. 8) that verifies the signature. In some cases, the calling application system may provide credentials without a digital signature, but in either case, the computing resource service provider may determine whether the calling application system is authorized to access resources of the service of the computing resource service provider by confirming that the calling application system has possession of a set of credentials associated with access permissions that grant the requested access.

Note that, in some embodiments, the determination of whether the set of credentials the calling application system currently possesses are outdated is made by the calling application system making an inquiry to a credentials agent of the most recent set of credentials. In some cases, the credentials agent may respond with a value representing a version of the most recent credentials, such as a version number, a checksum, cryptographic hash of the most recent credentials, first or last few characters of the most recent credentials, or the most recent credentials themselves. In some of these cases, the response may be digitally signed by the credentials agent. In other embodiments, the credentials agent notifies the calling application system that a credential rotation has occurred and, based on that notification, the calling application system may determine that its credentials are outdated. In still other embodiments, the calling application system checks a data store shared between the calling application system and the credentials agent for the most recent version of the credentials, and if the version in the data store differs from the version of credentials currently possessed by the calling application system, the determination may be made that the currently-possessed set of credentials are out of date. Note that in some embodiments, the calling application system retrieves the most recent set of credentials from the credentials agent or the data store each time the calling application system attempts to access a resource of the service of the computing resource service provider, and, in such embodiments, the system performing the process 700 may omit the operations of 704-06 and obtain a new set of credentials each time.

Note also that in some embodiments, the credentials agent is a separate application in communication with the calling application system, and running on the same or different computer system as the calling application system. In other embodiments, the credentials agent comprises executable program code executing in association with the calling application system (i.e., embedded/integrated into the executable code of the calling application). Note also that, in either embodiment, operations of 702-12 may be performed synchronously with a request to access a resource; that is, the determination to update a set of credentials may coincide with the need to access the resource. Additionally or alternatively, the operations of 704 and 708 may be performed asynchronously; that is, the determination to update a set of credentials may be performed independent of a particular need to access the resource (e.g., the calling application system could continuously or periodically poll the credentials agent for the latest credentials).

If the set of credentials possessed by the system executing the calling application are up-to-date, in 706, the calling application system may provide the set of credentials or proof of possession of the set of credentials to the computing resource service provider or service of the computing resource service provider hosting the resource the calling application system desires to access. Otherwise, if the set of credentials possessed by the calling application system are outdated, in 708, the calling application system may obtain the most recent set of credentials. In some embodiments, the calling application system receives the most recent set of credentials by requesting the credentials from the credentials agent or by the credentials agent pushing the latest credentials to the calling application system. In other embodiments, the calling application system requests a new set of credentials from a service of the computing resource service provider, such as the service hosting the resource the calling application system is needing to access or an authentication service, such as the such as the authentication system 818 of FIG. 8. In still other embodiments, the credentials agent stores the most recent credentials in a data store accessible to the calling application system, and the calling application system may obtain the most recent credentials by retrieving them from the data store. As noted, the data store containing the most recent credentials may be located on a computer system either local to or remote from the credentials agent and/or the calling application system.

Once obtaining the new set of credentials, the system performing the process 700 may proceed to 710, whereupon the calling application system may provide the new set of credentials or proof of possession of the new set of credentials to the computing resource service provider or service of the computing resource service provider hosting the resource the calling application system needs to access. Finally, once the computing resource service provider is satisfied that the calling application system is authorized to access the requested resources, in 712, the calling application system may be permitted access to the requested resources. Note that one or more of the operations performed in 702-12 may be performed in various orders and combinations, including in parallel.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

As illustrated in FIG. 8, the computing resource service provider 802, in various embodiments, includes an authentication system 818 and a policy management service 820. The computing resource service provider 802 may provide a variety of services to a customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more embodiments described or a variation thereof.

The computing resource service provider 802 may provide various computing resource services to its customers. The services provided by the computing resource service provider 802, in this example, include a virtual computer system service 808, a block-level data storage service 810, a cryptography service 812, an on-demand data storage service 814, a notification service 816, an authentication system 818, a policy management service 820, a task service 822, and one or more other services 824. It is noted that not all embodiments described include the services 808-24 described with reference to FIG. 8 and different services may be provided in addition to or as an alternative to services explicitly described. As described, each of the services 808-24 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block level data storage service 810). The authentication system 818, in an embodiment, is a computer system (i.e., collection of computing resources) configured to perform operations involved in authentication of users of the customer. For instance, one of the services 808-16 and 820-24 may provide information from a user to the authentication system 818 to receive information in return that indicates whether the user requests are authentic.

The policy management service 820, in an embodiment, is a computer system configured to manage policies on behalf of customers (such as customer 804) of the computing resource service provider 802. The policy management service 820 may include an interface that enables customers to submit requests related to the management of policy. Such requests may be, for instance, requests to add, delete, change, or otherwise modify policy for a customer or for other administrative actions, such as providing an inventory of existing policies.

The computing resource service provider 802, in various embodiments, is also equipped with a task service 822. The task service 822 is configured to receive a task package from the customer 804 and enable executing tasks as dictated by the task package. The task service 822 may be configured to use any resource of the computing resource service provider 802, such as one or more instantiated virtual machines or virtual hosts, for executing the task. The task service 822 may configure the one or more instantiated virtual machines or virtual hosts to operate using a selected operating system and/or a selected execution application in accordance with a requirement of the customer 804.

The computing resource service provider 802 additionally maintains one or more other services 824 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services.

Figure 9:
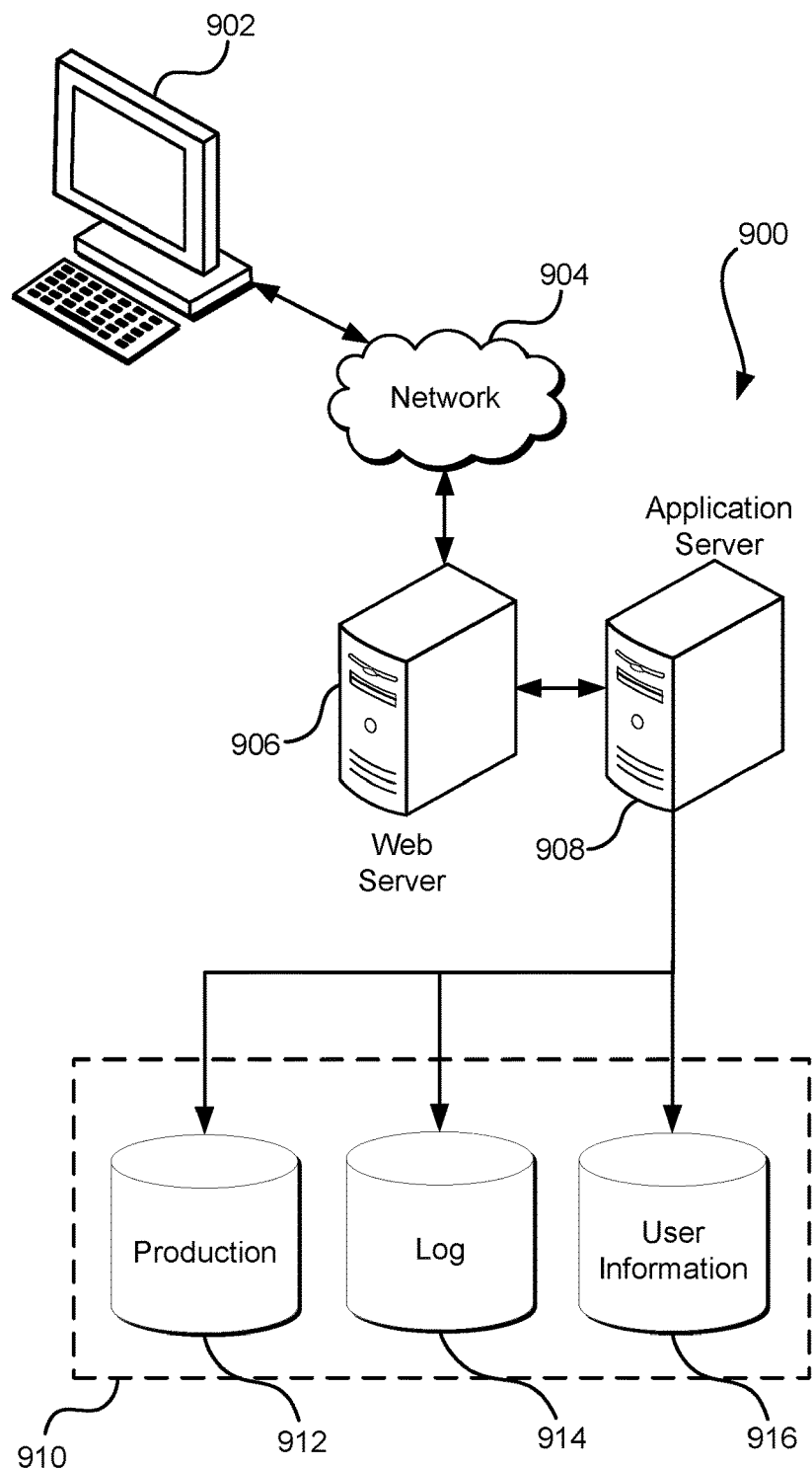
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other network, and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes an application server 908 and a data store 910. It should be understood that there could be several application servers, layers, or other elements, processes, or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, forms that are perceptible to the user audibly, visually, and/or through other senses including touch, taste, and/or smell. The handling of all requests and responses, as well as the delivery of content between the electronic client device 902 and the application server 908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices that can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize a network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    determining, based at least in part on a credential rotation policy, to rotate a first set of credentials to be used at least in part by a computing resource service provider to authenticate calls received from a set of calling applications, wherein access to a resource of the computing resource service provider by the set of calling applications involves authenticating the calls received from the set of calling applications; and
    rotating the first set of credentials by:
        obtaining a second set of credentials to be used at least in part to authenticate the calls received from the set of calling applications;
        providing information sufficient to prove access to the second set of credentials to a service of the computing resource service provider;
        storing the second set of credentials in a credential store hosted by one or more computer systems of the computing resource service provider; and
        notifying the set of calling applications of the second set of credentials;
    tracking, in parallel on a graph, a first frequency of usage of the first set of credentials and a second frequency of usage of the second set of credentials for a determined time period; and
    performing an operation from a set of operations as a result of the first frequency of usage being a value relative to a threshold, the set of operations including:
        causing the first set of credentials to be deactivated as a result of the value being at or below the threshold, while the second frequency of usage of the second set of credentials exceeds the first frequency of usage of the first set of credentials for the determined time period; and
        causing an alert to be sent to designated security personnel as a result of the first frequency of usage remaining above the threshold, while the second frequency of usage of the second set of credentials exceeds the first frequency of usage of the first set of credentials for the determined time period.

2. The computer-implemented method of claim 1, wherein the set of calling applications is a set of instances of an application, and wherein the set of instances are executing on one or more host computer systems of a distributed computing system.

3. The computer-implemented method of claim 1, wherein the method further comprises:
    receiving, from a calling application of the set of calling applications, a request for data, wherein the request includes, at least in part, proof of possession of the first set of credentials as authentication for the request; and
    receiving a response from the service of the computing resource service provider that includes the data requested together with information, based at least in part on the credential rotation policy, that indicates that the first set of credentials are due to be rotated.

4. The computer-implemented method of claim 1, wherein the credential rotation policy is a first credential rotation policy, the set of calling applications is a first set of calling applications, the resource of the computing resource service provider is a first resource of the computing resource service provider, and the method further comprises:
    determining, based at least in part on a second credential rotation policy, to rotate a third set of credentials for a second set of calling applications, different than the first set of calling applications; and rotating the third set of credentials by:
obtaining a fourth set of credentials to be used at least in part to authenticate calls received from the second set of calling applications;
providing information sufficient to prove access to the fourth set of credentials to the service of the computing resource service provider;
storing the fourth set of credentials in the credential store;
notifying the second set of calling applications of the fourth set of credentials; and
determining, based at least in part on a frequency of usage of the third set of credentials, to deactivate the third set of credentials.

5. The computer-implemented method of claim 1, wherein the causing an alert to be sent to designated security personnel indicates one of a misconfigured application or an unauthorized entity using the first set of credentials.

6. A system, comprising:
one or more processors; and
memory including instructions that, as a result of execution by the one or more processors, cause the system to:
track a first frequency of usage of a first set of credentials;
determine, based at least in part on a credential rotation policy, to rotate the first set of credentials, the credential rotation policy specifying one or more conditions that cause credential rotation to trigger, the one or more conditions being fulfilled at least:
according to a stochastic randomization scheme; or
as a result of a rate of authentication calls dropping below a threshold;
cause a second set of credentials to be generated, the second set of credentials being used at least in part to authenticate a request received from a calling application;
notify the calling application of the second set of credentials;
store the second set of credentials in a data store;
track, in parallel with tracking the first frequency of usage, a second frequency of usage of the second set of credentials for a certain time period;
generate a visualization of the tracking in parallel, the first frequency of usage and the second frequency of usage for the certain time period;
as a result of the first frequency of usage being a first value at or below a threshold while the second frequency of usage of the second set of credentials exceeds the first frequency of usage of the first set of credentials for a the certain time period, deactivate the first set of credentials; and
as a result of the first frequency of usage being a second value above the threshold while the second frequency of usage of the second set of credentials exceeds the first frequency of usage of the first set of credentials for the certain time period, send an alert to designated personnel.

7. The system of claim 6, wherein the memory further includes instructions that cause the system to:
determine, based at least in part on a frequency of usage of the first set of credentials, to deactivate the first set of credentials; and
causing the first set of credentials to be deactivated by denying authentication of requests that are accompanied by proof of possession of the first set of credentials.

8. The system of claim 6, wherein the instructions that generate the visualization further include instructions that cause the system to generate the visualization to graphically display an unexpected state if the first frequency of usage remains above the threshold for the certain amount of time.

9. The system of claim 6, wherein the memory further includes instructions that cause the system to:
track information that identifies:
one or more services being called by one or more applications making application programming interface calls providing proof of possession of the first set of credentials or proof of possession of the second set of credentials for authentication; and
descriptive information for identifying origins of the application programming interface calls providing the proof of possession of the first set of credentials or providing the proof of possession of the second set of credentials for authentication; and
generate a visualization that maps the first set of credentials and the second set of credentials to the one or more services identified and the descriptive information.

10. The system of claim 6, wherein the memory further includes instructions that cause the system to:
determine that the first frequency of usage is in an unexpected state, which results in the sending an alert to the designated personnel.

11. The system of claim 6, wherein:
the one or more conditions,
being further fulfilled at least as a result of credentials being used for a certain number of authentication calls, or
on demand by an authentication system of a computing resource service provider.

12. The system of claim 6, wherein the instructions that cause the second set of credentials to be generated include instructions that cause a credentials agent executing in association with the calling application to generate the second set of credentials and transmit the second set of credentials to a service of a computing resource service provider.

13. The system of claim 6, wherein the calling application is one of a plurality of calling applications and the second set of credentials is used at least in part to authenticate a request received from any of the plurality of calling applications.

14. The system of claim 13, wherein:
the plurality of calling applications includes a set of first application instances and a set of second application instances;
the set of first application instances includes of one or more instances of a first application;
the set of second application instances includes of one or more instances of a second application different from the first application;
a first credential rotation policy is enforced on the set of first application instances by a first credentials agent; and
a second credential rotation policy is enforced on the set of second application instances by a second credentials agent.

15. A non-transitory computer-readable storage medium having stored thereon executable instructions that, as a result of execution by one or more processors of a computer system, cause the computer system:
determine, based at least in part on a credential rotation policy, to rotate the first set of credentials the credential rotation policy specifying one or more conditions that cause credential rotation to trigger, the one or more conditions being fulfilled at least:
according to a stochastic randomization scheme, or
as a result of a rate of authentication calls dropping below a pre-determined number;
generate a second set of credentials to be used at least in part to authenticate a request received from a calling application;
store the second set of credentials in a data store;
provide notice via a credentials agent indicating that a first set of credentials is due to be rotated and that a second set of credentials, different from the first set of credentials, has been stored in the data store;
track, in parallel for a determined time period, a frequency of usage of the first set of credentials and a second frequency of usage of the second set of credentials;
on a condition that the frequency of usage of the first set of credentials is at or below a threshold while the second frequency of usage of the second set of credentials exceeds the first frequency of usage of the first set of credentials for a certain amount of time, deactivate the first set of credentials; and
on a condition that the frequency of usage of the first set of credentials is above the threshold while the second frequency of usage of the second set of credentials exceeds the first frequency of usage of the first set of credentials for the certain amount of time, send an alert to designated personnel.

16. The non-transitory computer-readable storage medium of claim 15, wherein:
the executable instructions further cause the computer system to receive a request, via the credentials agent, for data from a resource accessible to the computer system, wherein the request includes, at least in part, proof of possession of the first set of credentials as authentication for the request; and
the executable instructions that cause the computer system to provide the notice further include instructions that cause the computer system to provide, via the credentials agent, the data together with the notice.

17. The non-transitory computer-readable storage medium of claim 16, wherein the resource is hosted by one or more computer systems in a distributed network of computer systems.

18. The non-transitory computer-readable storage medium of claim 15, wherein the credentials agent is a component of an authorization system of a computing resource service provider.

19. The non-transitory computer-readable storage medium of claim 15, wherein the notice received via the credentials agent is based at least in part on the credential rotation policy, wherein the credential rotation policy is obtained by the credentials agent from a computing resource service provider and the credential rotation policy includes specified conditions for triggering rotation of credentials.

20. The non-transitory computer-readable storage medium of claim 15, wherein the executable instructions further include instructions that cause the computer system to generate a visualization of the first frequency of usage and the second frequency of usage.

* * * * *